United States Patent
Bolourchi et al.

(10) Patent No.: US 9,415,798 B2
(45) Date of Patent: Aug. 16, 2016

(54) INERTIA COMPENSATION TO REMOVE OR REDUCE EFFECTS OF TORQUE COMPENSATION IN ELECTRIC POWER STEERING

(71) Applicant: STEERING SOLUTIONS IP HOLDING CORPORATION, Saginaw, MI (US)

(72) Inventors: Farhad Bolourchi, Novi, MI (US); Zaki Ryne, Saginaw, MI (US); Robert E. Beyerlein, Hemlock, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/630,179

(22) Filed: Feb. 24, 2015

(65) Prior Publication Data
US 2015/0239491 A1    Aug. 27, 2015

Related U.S. Application Data
(60) Provisional application No. 61/944,740, filed on Feb. 26, 2014.

(51) Int. Cl.
*B62D 5/04*    (2006.01)
(52) U.S. Cl.
CPC .............. *B62D 5/04* (2013.01); *B62D 5/0463* (2013.01)
(58) Field of Classification Search
CPC ......... B62D 5/04; B62D 5/0463; G01L 5/221
See application file for complete search history.

(56) References Cited

U.S. PATENT DOCUMENTS

| | | | | |
|---|---|---|---|---|
| 6,360,151 B1 * | 3/2002 | Suzuki | ............... | B62D 5/046 180/446 |
| 7,604,088 B2 * | 10/2009 | Nishizaki | ............... | B62D 6/10 180/444 |
| 2004/0162655 A1 * | 8/2004 | Patankar | ............... | B62D 5/0472 701/41 |
| 2015/0066302 A1 * | 3/2015 | Yang | ............... | B62D 5/0472 701/42 |

FOREIGN PATENT DOCUMENTS

| | | | |
|---|---|---|---|
| DE | 102005009350 A1 | | 9/2006 |
| EP | 0842841 A1 | * | 5/1998 |
| EP | 1093992 A2 | | 4/2001 |
| EP | 1211157 A2 | | 6/2002 |

(Continued)

OTHER PUBLICATIONS

Extended European search report for related European application No. 15156541.3, dated: Jun. 6, 2016, pp. 8.

*Primary Examiner* — Michael J Zanelli
(74) *Attorney, Agent, or Firm* — Cantor Colburn LLP

(57) ABSTRACT

A method of controlling a power steering system is provided. The method generates a base torque command based on a hand wheel torque signal without altering the hand wheel torque signal at a range of relatively low frequencies. The method generates a motor inertia compensation command based on a motor inertia of a motor of the power steering system. The method generates an assist torque command based on the base torque command and the motor inertia compensation command. The method operates a motor of the power steering system to generate a torque based on the assist torque command.

20 Claims, 16 Drawing Sheets

(56) References Cited

FOREIGN PATENT DOCUMENTS

| | | | |
|---|---|---|---|
| EP | 1211158 | A2 | 6/2002 |
| EP | 1291262 | A2 | 3/2003 |
| EP | 1415891 | A1 | 5/2004 |
| EP | 2567880 | A2 | 3/2013 |
| WO | 02100704 | A2 | 12/2002 |

* cited by examiner

INERTIA COMPENSATION TO REMOVE OR REDUCE EFFECTS OF TORQUE COMPENSATION IN ELECTRIC POWER STEERING

This patent application claims priority to U.S. Provisional Patent Application Ser. No. 61/944,740, filed Feb. 26, 2014, which is incorporated herein by reference in its entirety.

BACKGROUND OF THE INVENTION

Existing compensation structures for Electric Power Steering (EPS) systems often use torque loop compensation for an electric motor control system. In such existing EPS systems, a torque compensator, commonly a notch filter, is employed in the torque path to ensure that the system remains stable. However, application of a torque compensator may make the EPS system sensitive to disturbances or affect steering feel due to a phase lag, etc. The compensator may also cause the on-center feel to be less precise. The compensator may also have other side effects on the feel such as a road feel, a torque ripple, etc. Moreover, the frequency content of most of these issues typically corresponds to the frequencies of the compensator. Therefore, stability is achieved at a cost to steering feel.

By comparison, Hydraulic Power Steering (HPS) systems, which are functionally equivalent to EPS systems, do not have any torque path compensation, or the mechanical compensation that the HPS systems have at higher frequencies. The higher frequency compensation tends to be in the audible range (e.g., above 80 Hertz (Hz)), and therefore, does not adversely affect the lower frequencies (e.g., less than 10 Hz) corresponding to a steering feel range. Furthermore, in many ways (e.g., on-center feel, road feel, etc.), the HPS systems are still considered to have "premium feel."

SUMMARY OF THE INVENTION

In one embodiment of the invention, a method of controlling a power steering system is provided. The method generates a base torque command based on a hand wheel torque signal without altering the hand wheel torque signal at a range of relatively low frequencies. The method generates a motor inertia compensation command based on a motor inertia of a motor of the power steering system. The method generates an assist torque command based on the base torque command and the motor inertia compensation command. The method operates a motor of the power steering system to generate a torque based on the assist torque command.

In another embodiment of the invention, a control system for controlling a power steering system is provided. The control system comprises a sensor for detecting observable conditions of a motor of the power steering system. The control system further comprises a control module. The control module is configured to generate a base torque command based on a hand wheel torque signal without altering the hand wheel torque signal at a range of relatively low frequencies. The control system is further configured to generate a motor inertia compensation command based on a motor inertia of a motor of the power steering system. The control system is further configured to generate an assist torque command based on the base torque command and the motor inertia compensation command. The control system is further configured to operate the motor to generate a torque based on the assist torque command.

In yet another embodiment of the invention, a control system for controlling a power steering system is provided. The system comprises a first module configured to generate a base torque command based on a hand wheel torque signal without altering the hand wheel torque signal at a range of relatively low frequencies. The system further comprises a second module configured to generate a motor inertia compensation command based on a motor inertia of a motor of the power steering system. The system further comprises a third module configured to generate an assist torque command based on the base torque command and the motor inertia compensation command. The system further comprises a fourth module configured to operate a motor of the power steering system to generate a torque based on the assist torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
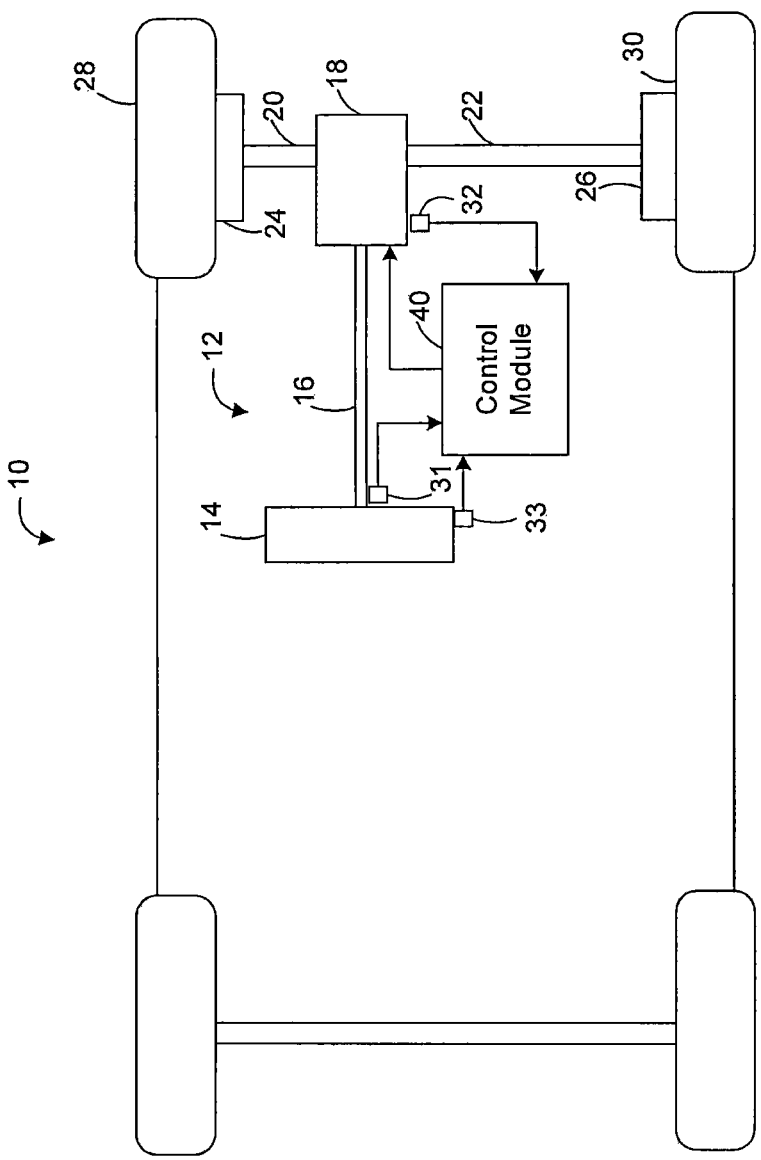
FIG. 1 illustrates a functional block diagram of a steering system in accordance with various embodiments of the invention.

The following description is merely exemplary in nature and is not intended to limit the present disclosure, its application or uses. It should be understood that throughout the drawings, corresponding reference numerals indicate like or corresponding parts and features.

Electric power systems often employ a torque compensator, commonly a notch filter (also referred to as a band-stop filter), in the torque path to ensure that the system remains stable. It should be appreciated that deeper notch filters (e.g., those exhibiting more gain reduction at the notch frequency) while providing necessary stability often degrade the disturbance rejection properties of the system at the notch frequency. Further, it should be recognized that a closed loop system cannot reject disturbances where the gain is very low, as it is at the notch center frequency. Additionally, notch filters may also affect the closed loop response of the system (e.g., input impedance) if their gain and phase characteristics intrude on the frequency range of operator inputs. The ill effects of the low frequency sensitivity are transmitted to and felt by the driver in the form of disturbances caused by friction in mechanical parts. Torque compensators may be designed to have phase lead characteristics at higher vehicle speeds, for example. Such compensators also interfere with steering feel at lower frequencies and are objectionable. The systems and methods of the embodiments of the invention have no torque compensator or have a torque compensator that has higher frequency dynamics.

An exemplary embodiment of the invention, by way of illustration, is described herein and may be applied to a torque control system for an electric motor in a vehicle steering system. While a preferred embodiment is shown and described, it will be appreciated by those skilled in the art that the invention is not limited to the embodiment described herein, but also to any control system employing an electric machine with torque compensation.

Referring now to FIG. 1, where the invention will be described with reference to specific embodiments without limiting same, an exemplary embodiment of a vehicle 10 including a steering system 12 is illustrated. In some embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering assist unit 18 provides the assistance to move the tie rods 20, 22 which in turn move steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In some embodiments, the sensors 31-33 may include, for example, a hand wheel torque sensor, a hand wheel angle sensor, a motor velocity sensor, a motor acceleration sensor, a motor inertial torque sensor, and other sensors. The sensors 31-33 send the signals to the control module 40. It is to be noted that, although three sensors are depicted as being disposed at certain locations within the steering system 12 for the simplicity of illustration, the number of sensors may be more or less than three and may be disposed in other different locations in the steering system 12 or the vehicle 10.

In some embodiments, a control module 40 controls the operation of the steering system 12 and/or the vehicle 10 based on one or more of the sensor signals and further based on the assist torque calculation system and method of the present disclosure. Generally speaking, the control module 40 of some embodiments of the invention generates an assist torque command that provides necessary stability in the system, without relying on a notch filter for filtering a hand wheel torque signal. More specifically, the control module 40 of some embodiments does not use a notch filter or push a notch filter's frequencies to higher frequencies (e.g., above 70 Hz). In some embodiments, the control module 40 includes a motor inertia compensator to provide the stability of the system and eliminate the need of a notch filter.

Figure 2:
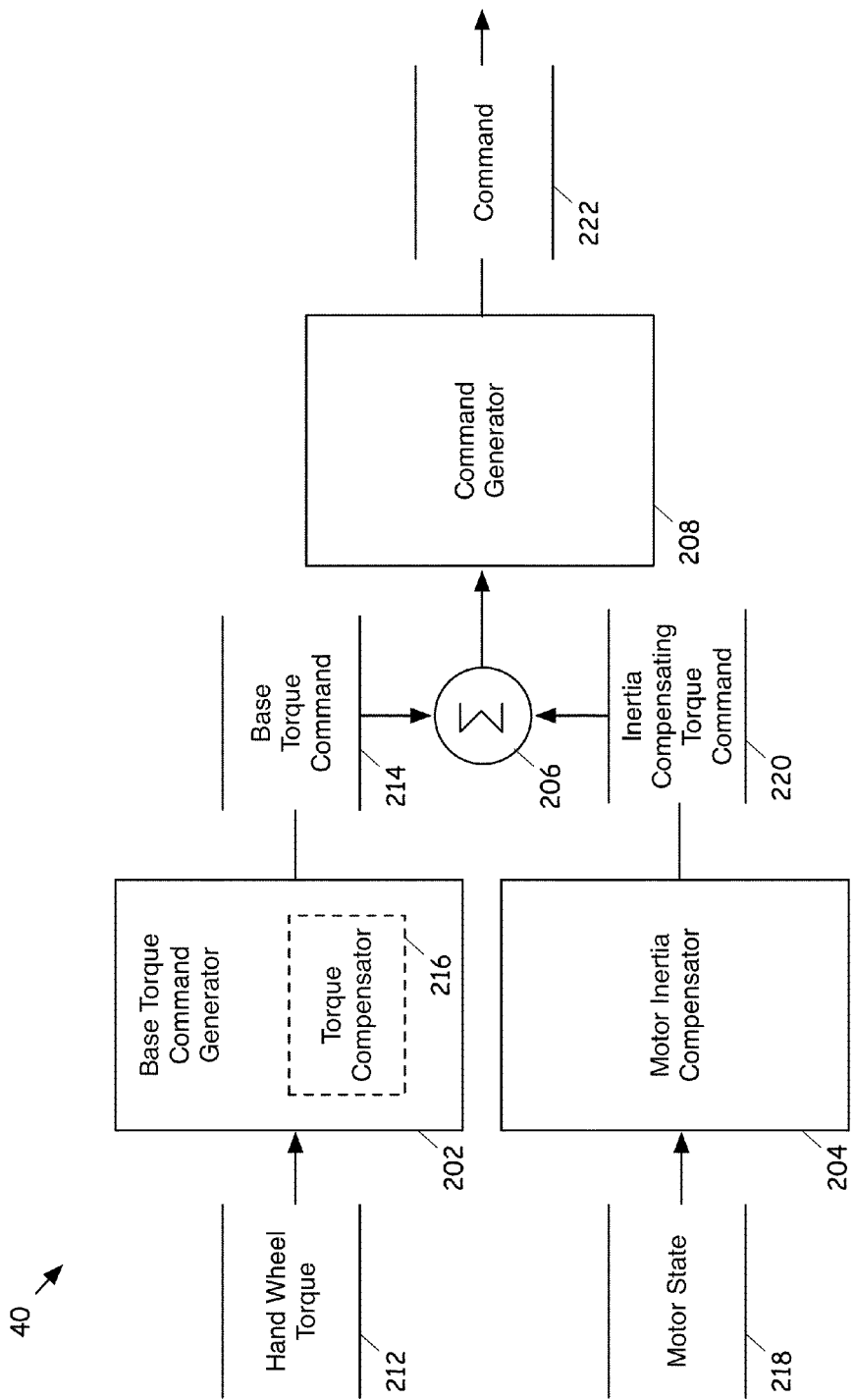
FIG. 2 illustrates a schematic diagram of a control module in accordance with various embodiments of the invention.

FIG. 2 illustrates a simplified schematic diagram of the control module 40 of FIG. 1 in accordance with exemplary embodiments of the invention. As shown, the control module 40 may include datastores and submodules, such as a base torque command generator 202, a motor inertia compensator 204, a summing unit 206, and a command generator 208. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in the figures can be combined and/or further partitioned. As can be appreciated, the sub-modules shown in the figures can be implemented as a single control module 40 (as shown) or multiple control modules (not shown). Inputs to the control module 40 can be generated from the sensors of the vehicle 10, can be modeled within the control module 40 (e.g., by other sub-modules (not shown)), can be received from other control modules (not shown), and/or can be predefined.

The base torque command generator 202 generates a base torque command 214 based on a hand wheel torque signal 212. The base toque command 214 specifies an amount of assist torque to be generated by the motor of the steering assist unit 18 of FIG. 1. In some embodiments, the base torque command generator 202 includes a torque compensator 216 that compensates the feedback torque in a higher frequency range (e.g., 70 Hz). That is, in some embodiments, the torque compensator 216 is implemented as a notch filter, of which the altering frequency range lies above 70 Hz.

The motor inertia compensator 204 generates an inertia compensating torque command 220 based on a motor state signal 218. In some embodiments, the motor state signal 218 includes a motor velocity signal indicating the velocity of the motor (not shown in FIG. 2). The motor velocity signal is generated by a motor velocity sensor (e.g., one of the sensors 31-33 in FIG. 1). In these embodiments, the motor inertia compensator 204 generates the inertia compensating torque command 220 based on the following equation:

$$IC = (J_{mot})(s)\left(\frac{(s+a*2\pi)}{(s+b*2\pi)^2}\right)\left(\frac{b^2 2\pi}{a}\right) \quad (1)$$

From the equation (1), it should be noted that the input (i.e., the motor velocity 218) and the output (i.e., IC, the inertia compensating torque command 220) are both in the motor coordinate. The 's' term (i.e., the second term in the right side of the equation) represents differentiation of the motor velocity (i.e., angular acceleration, a), and the parameters a and b provide dynamic effects when required. The derivation of the equation (1) will be described in more detail further below with reference to FIGS. 3-6.

In some embodiments, the motor state signal 218 includes a motor acceleration signal indicating the motor angular acceleration of the motor. The motor acceleration signal is generated by a motor acceleration sensor (e.g., one of the sensors 31-33 in FIG. 1). In these embodiments, the motor inertia compensator 204 generates the inertia compensating torque command 220 based on the following equation:

$$IC = (J_{mot})\left(\frac{(s+a*2\pi)}{(s+b*2\pi)^2}\right)\left(\frac{b^2 2\pi}{a}\right) \quad (2)$$

In contrast to the equation (1), in the equation (2), a derivative term 's' is not necessary because the input to the equation is the motor angular acceleration measurement from the motor acceleration sensor. The equation (2) may be implemented in various fashions. It should be noted that, regardless of how the equation (2) is implemented, the bandwidth of such measurement (as measured by 45° phase lag), including sampling effects, is required to be at least 250 Hz in some embodiments. The derivation of the equation (2) as well as structural and functional details of an exemplary motor acceleration sensor will be described in more detail further below with reference to FIG. 7-11.

In some embodiments, the motor state signal 218 includes an inertial torque signal that is a product of the motor inertia and the motor acceleration. In some embodiments, this inertial torque signal is generated by a motor inertial torque sensor (e.g., one of the sensors 31-33 in FIG. 1). The structural and functional details of an exemplary motor inertial torque sensor will be described in more detail further below with reference to FIG. 12-14

The command generator 208 receives an assist torque command, which is a summation of the base torque command 214 and the inertia compensating torque command 220 via summing unit 206 and in response thereto, generates a command signal 222 to control the motor the steering system 12. In some embodiments, the command generator 208 outputs a motor command specifying a voltage to be applied to the motor of the steering assist unit 18 in order for the motor to generate a desired assist torque. For the simplicity of the description and illustration, the details (e.g., a PI controller) of the command generator 208, which one with the ordinary skill in the art should recognize, are omitted in this disclosure.

Figure 3:
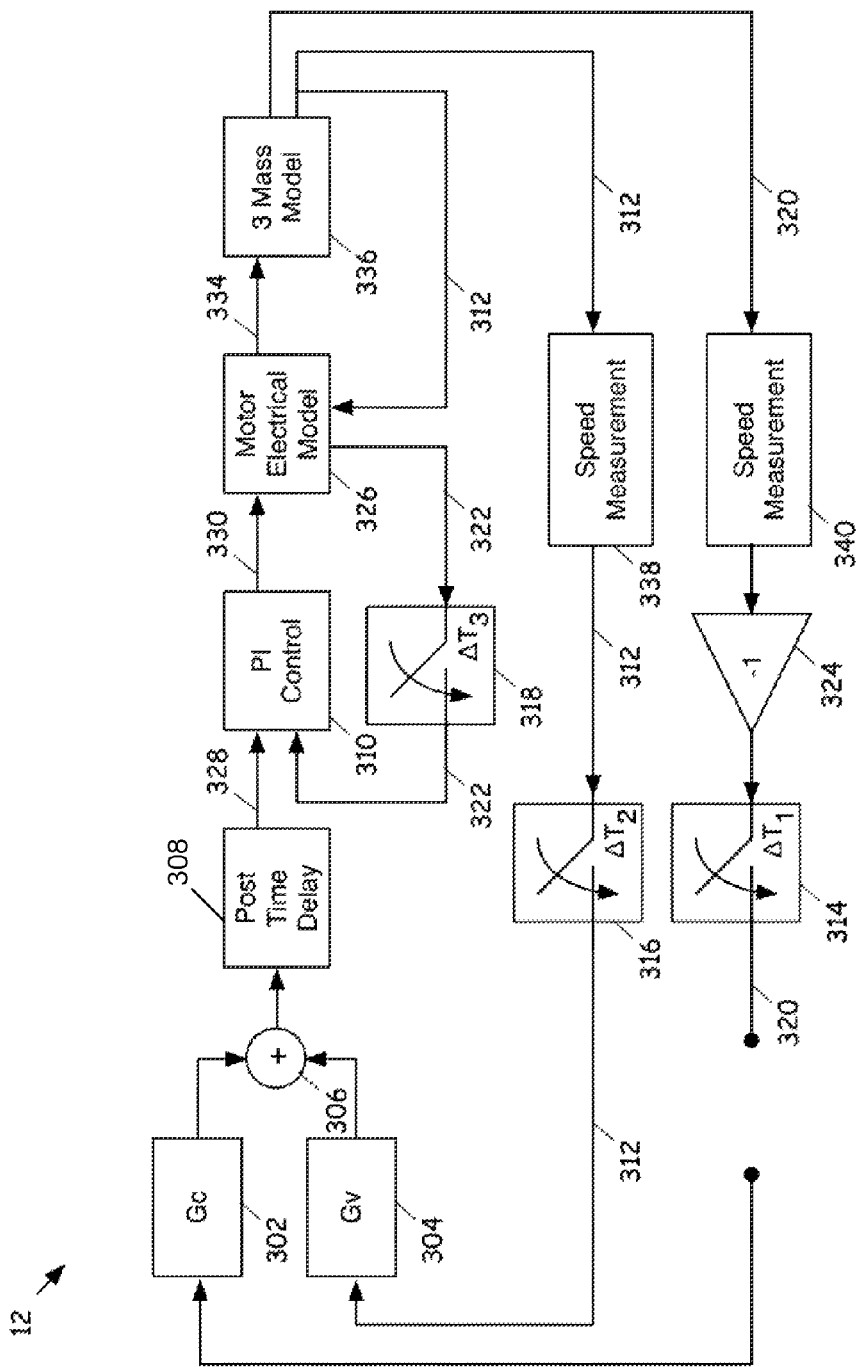
FIG. 3 a schematic diagram of an exemplary steering system in a torque open loop configuration in accordance to various embodiments of the invention.

FIG. 3 a schematic diagram of the steering system 12 of FIG. 1, which includes the control module 40 of FIGS. 1 and 2. Specifically, FIG. 3 illustrates a torque open loop configuration in accordance to some embodiments of the invention.

In FIG. 3, the steering system 12 includes a Gc block 302, a Gv block 304, a summation unit 306, a post time delay unit 308, and a PI control 310.

The Gc block 302 represents the base torque command generator 202 of FIG. 2, and The Gv block 304 represents the motor inertia compensator 204 of FIG. 2. The blocks 302 and 304 implement transfer functions to compute gains Gc and Gv. In some embodiments, Gv block 304 is in the motor velocity path and is designed such that the torque compensator part (e.g., the torque compensator 216) of the Gc block is eliminated or is pushed to higher frequencies (e.g., 70 Hz).

The $\Delta T_1$, $\Delta T_2$, and $\Delta T_3$ blocks 314, 316, and 318 represent sampling effects in the torque path 320, the velocity path 312, and the current path 322, respectively. The delays inherent in these sampling operations influence the design of the Gv block 304 in some embodiments. The block 324 is shown in the torque path 320 in order for resulting bode plots shown in FIG. 4 below to be consistent with the negative feedback nature of classical feedback structures.

The post time delay block 308 represents the effects of post time delay in digital calculations. The block 308 takes in a summed signal from a summing unit 306 and outputs a current control command 328 to the PI control block 310. The PI control block 310 determines a motor voltage command 330 based on the current control command 328 and the feedback current (i.e., actual current drawn to the motor) from the current path 322. The PI control block 310 outputs the motor voltage command 330 to the motor electrical model block 326, which outputs the final torque command 334 to an EPS 3-mass plant (3M) model 336 to close the loop. The block 338 in the velocity path 312 represents motor speed measurement dynamics and effects of sampling in the motor velocity path 312. The block 340 in the torque path 320 represents torque sensor measurement dynamics as well the sampling effects.

Figure 4:
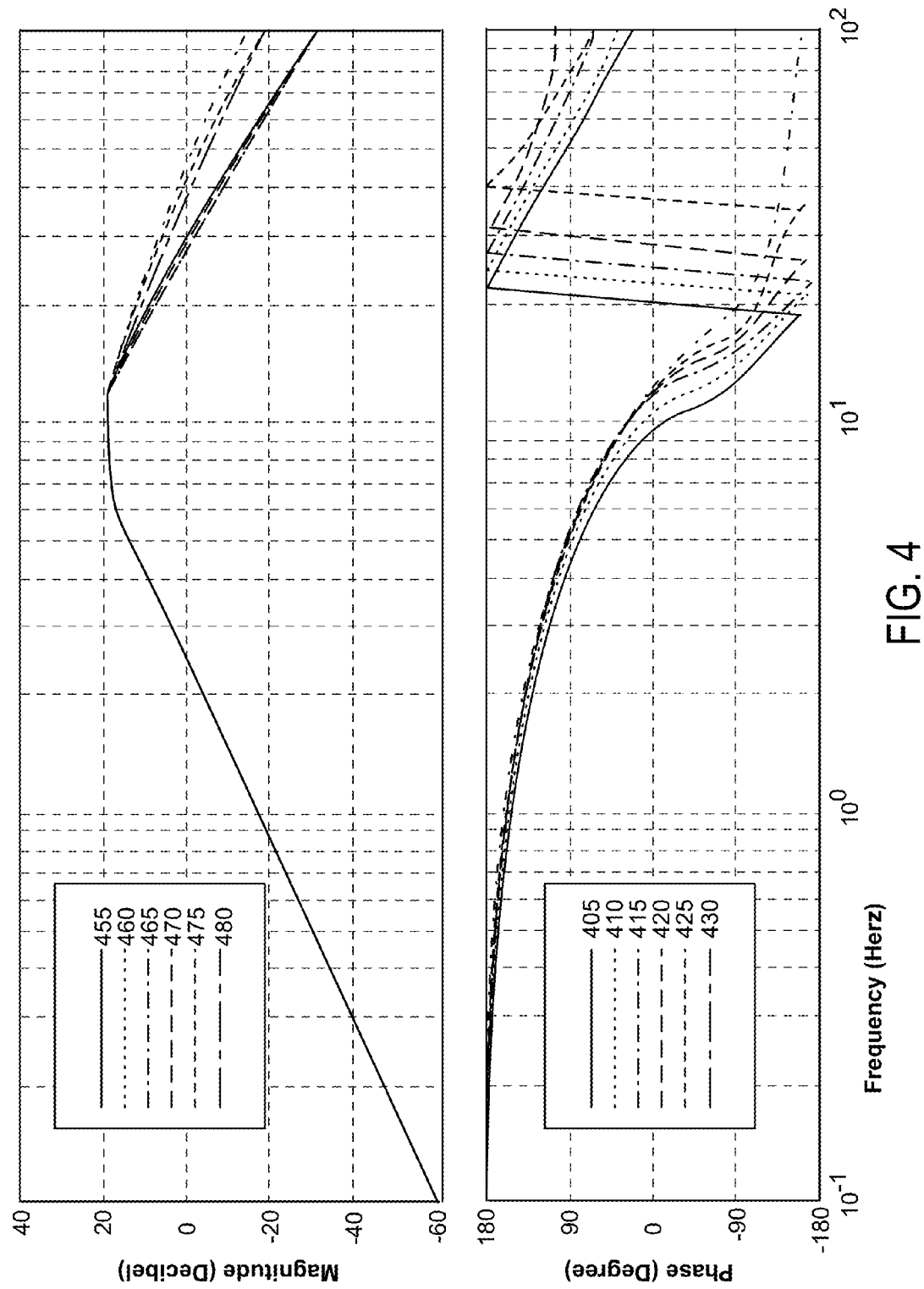
FIG. 4 illustrates various torque open loop bode plots of steering systems in various embodiments of the invention.

FIG. 4 illustrates various torque open loop bode plots in various embodiments of the invention. It should be noted that the phase cross over frequency (i.e., a frequency at which the phase plot reaches −180°) is important to the closed loop stability. In the case of base steering system (i.e., without the Gv block 304 in FIG. 3) represented by a curve 405, the cross over frequency is slightly less than 20 Hz. With the corresponding magnitude plot (i.e., a curve 455) being above zero dB, the steering system would be unstable in closed loop (i.e., when the torque path show in FIG. 3 is closed) and the torque compensator in the Gc block 302 of FIG. 3 may be needed for providing the stabilization. Conversely, the curve 430 in the phase plot does not cross −180°. Thus, the steering system would be stable without a torque compensator in the Gc block 302.

When the commanded torque is forced to be the same as the assist torque provided by the motor (i.e., when the output of the summation unit 306 is set to the final torque 334 generated by the motor), a curve 410 is achieved. That is, a shift (from the curve 405 to the curve 410) of about 10 Hz in the phase cross over frequency is achieved. Thus, it follows that, if the motor was to be replaced with an ideal torque generating machine, the goal of eliminating the torque compensator in the Gc block 302 is not achieved because the curve 410 crosses −180°—i.e., the steering system is not stable).

In some embodiment, the curve 430 is achieved by removing the sampling ($\Delta T_1$ block 314 of FIG. 3) and the associated delays in generating the torque command (by the Gc block 302), As a result, the phase cross over frequency is moved by few Hz at most to a curve 415. Then, removing measurement dynamics in the measurement blocks 338 and 340 of FIG. 3 (i.e., anti-aliasing filter, etc.) results in a curve 425, which shows another 10 Hz change in the cross over frequency.

With these incremental improvements shown by the movement from the curve 405 to the curve 425 and the movement from the corresponding magnitude plot curves from 455 to 470, it is concluded that, if the physical inertia of the motor (in the 3M model 336) is lowered to a value close to zero, the phase cross over frequency shifts by a large frequency difference. A crossing from above to below −180° does not occur until at 100 Hz, as shown by the curve 430 in FIG. 4. Consequently, the steering system would be stable without any torque compensator in the Gc block 302 if the system is designed to achieve the curve 430.

From the above description of the bode plots shown in FIG. 4, it is concluded that most of the shift in the cross over frequency is due to removing the motor inertia. In particular, the curve 430 represents an accumulation of effects. The curve 425 shows where the cross over frequency would be if only the motor inertia is reduced. The curve 425 shows where the base curve 405 would move when the motor inertia is reduced by removing sampling effects, delays, motor dynamics, and torque measurement dynamics. The comparison between the curve 425 and the base curve 405 shows that the cross over frequency has shifted by almost 40 Hz due to removing the inertial effects. Comparing the curve 425 with the base curve 405 reveals that the inertial effects shift the cross over frequency more than removal of all other effects does as combined.

Having identified that the removal of motor inertia shifts the base curve 405 the most, the inertia compensation design (i.e., the Gv block 304) in various embodiments will now be described. Specifically, several different alternative designs of the inertia compensation, including motor velocity based designs, motor acceleration based designs, and observer based designs will now be described.

Figure 5:
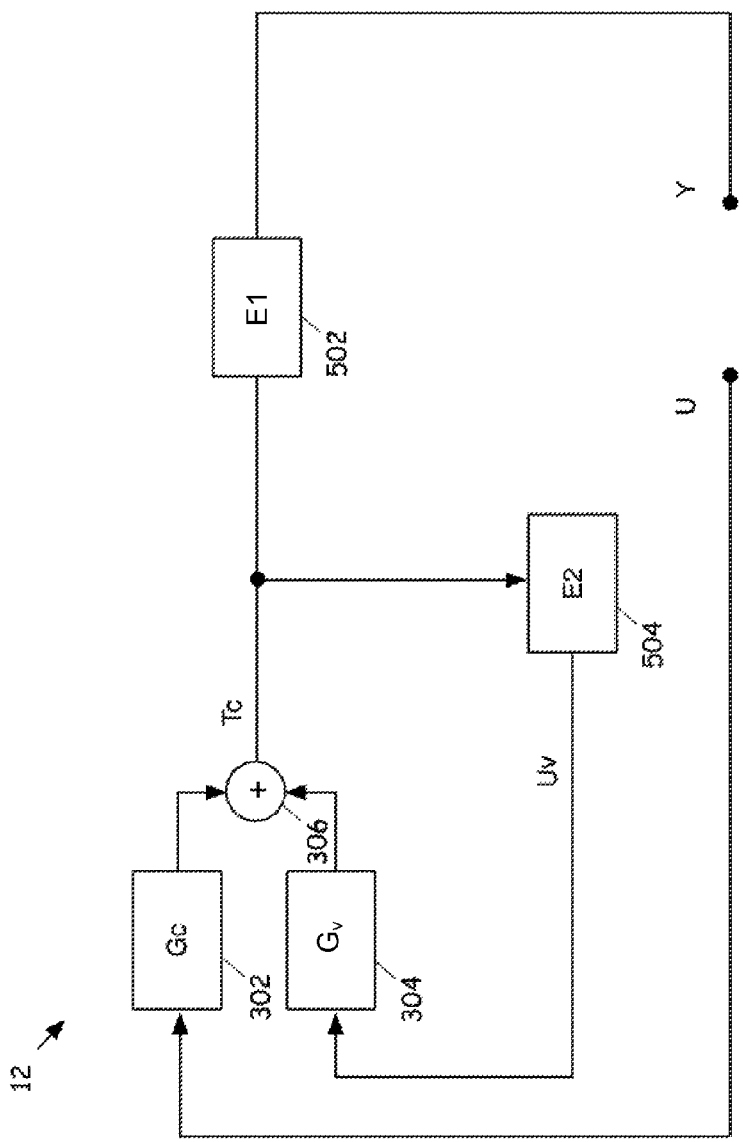
FIG. 5 illustrates a simplified schematic diagram of a steering system in accordance to various embodiments of the invention.
Figure 6:
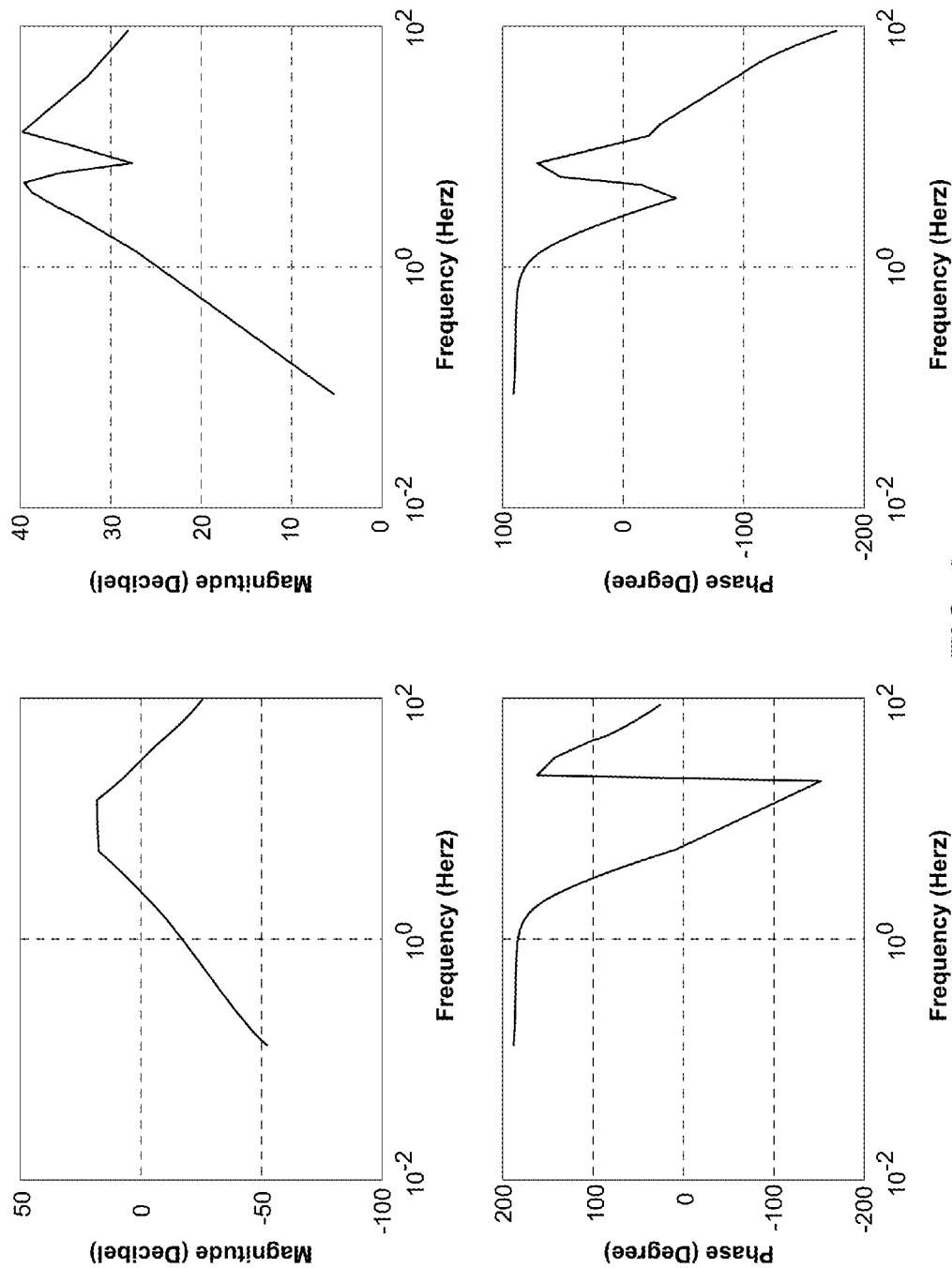
FIG. 6 illustrates bode plots corresponding to frequency response vectors in accordance to various embodiments of the invention.

FIG. 5 illustrates a simplified schematic diagram of the steering system 12 of FIGS. 1 and 3. As shown, the steering system 12 is modeled to include E1 and E2 blocks 502 and 504. It is to be noted that E1 and E2 blocks 502 and 504 shown in FIG. 5 implement transfer functions for determining E1 and E2, which represent delays, sampling, measurement dynamics, and actuator dynamics. In some embodiments, Gc computed by the steering system 12 shown in FIG. 3 is a fixed gain. In some embodiments, the computed gain Gc may be replaced with a bath tub curve (e.g., a U-shaped curve). The bode plots corresponding to E1 and E2 blocks are shown in FIG. 6. Specifically, the left half of FIG. 6 shows a bode plot for E1 and the right half of FIG. 6 shows a bode plot for E2.

In some embodiments, frequency response vectors that correspond to the bode plots illustrated in FIG. 6 are used. Also, an open loop transfer as a function of the components E1 and E2 is formulated in some embodiments. Based on the algebraic manipulation, the open loop transfer function may be derived from the following three equations:

$$Y = E_1 T_c \quad (3)$$

$$T_c = G_c U + G_v U_v \quad (4)$$

$$U_v = E_2 T_c \quad (5)$$

where $T_c$ is the assist torque command, which is output of the summing unit 206. Substituting $U_v$ in the equation (4) with $E_2 T_c$ from the equation (5), the following equation is derived:

$$T_c = G_c + G_v E_2 T_c = \frac{G_c}{1 - G_v E_2} U \quad (6)$$

Then, from equations (3) and (6), the following equation is derived.

$$Y = \frac{G_c E_1}{1 - G_v E_2} U \quad (7)$$

The open loop transfer function $T_O$ may be derived using the equation (7), as the following equation:

$$T_O = \frac{Y}{U} = \frac{G_c E_1}{1 - G_v E_2} \quad (8)$$

In some embodiments, $T_O$ is set to the frequency response vector corresponding to the target curve 430 shown in FIG. 4. Then, solving the equation (8) for $G_v$ as a function of $T_O$, $E_1$, $E_2$ and the assist path gain results in the following equation:

$$G_v = \frac{T_O - G_c E_1}{T_O E_2} \quad (9)$$

Figure 7:
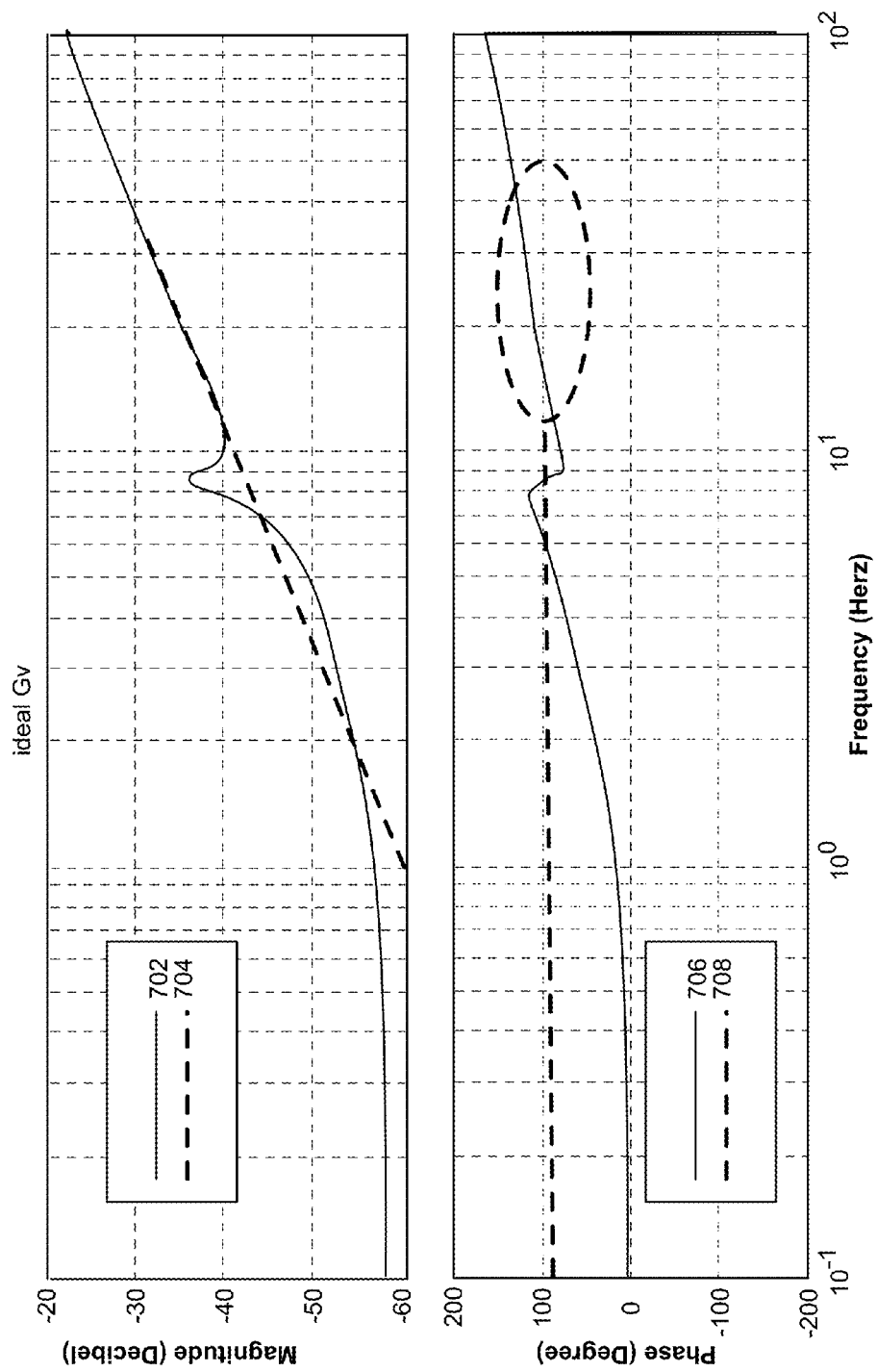
FIG. 7 illustrates bode plots that represent a frequency response in accordance to various embodiments of the invention.

FIG. 7 illustrates the frequency response of the $G_v$, determined based on the equation (9). In order to design and implement $G_v$ digitally, this frequency response should be matched with a transfer function in the analog s-domain and followed up with a digital conversion to the z-domain. First, it is determined that very low direct current (DC) gain may be ignored. Secondly, the blip near 10 Hz shown in the bode plot may also be ignored. On the other hand, the 20 dB/decade slope and the additional phase lead after 10 Hz may not be ignored. The slope means that the input (e.g., the motor velocity) needs to be differentiated to form motor acceleration. The phase lead after 10 Hz compensates for the delays and sampling effects in the steering system. The solid curve 702 in the magnitude graph in FIG. 7 represents the plot for the analog implementation and the dotted line 704 in the magnitude graph represents plot for the digital implementation. The dotted line shows increase in magnitude by 20 dB per decade. Likewise, the solid curve 706 in the phase graph in FIG. 7 represents the plot for the analog implementation and the portion of the solid line encircled by the dotted ellipse 708 represents plot for the digital implementation.

Based on the above discussion, the motor velocity based design for the $G_v$ block 304 is based on the following equation (10):

$$G_v = \frac{s[s + 35(2\pi)]}{[s + 35(2\pi)]^2} \quad (10)$$

Figure 8:
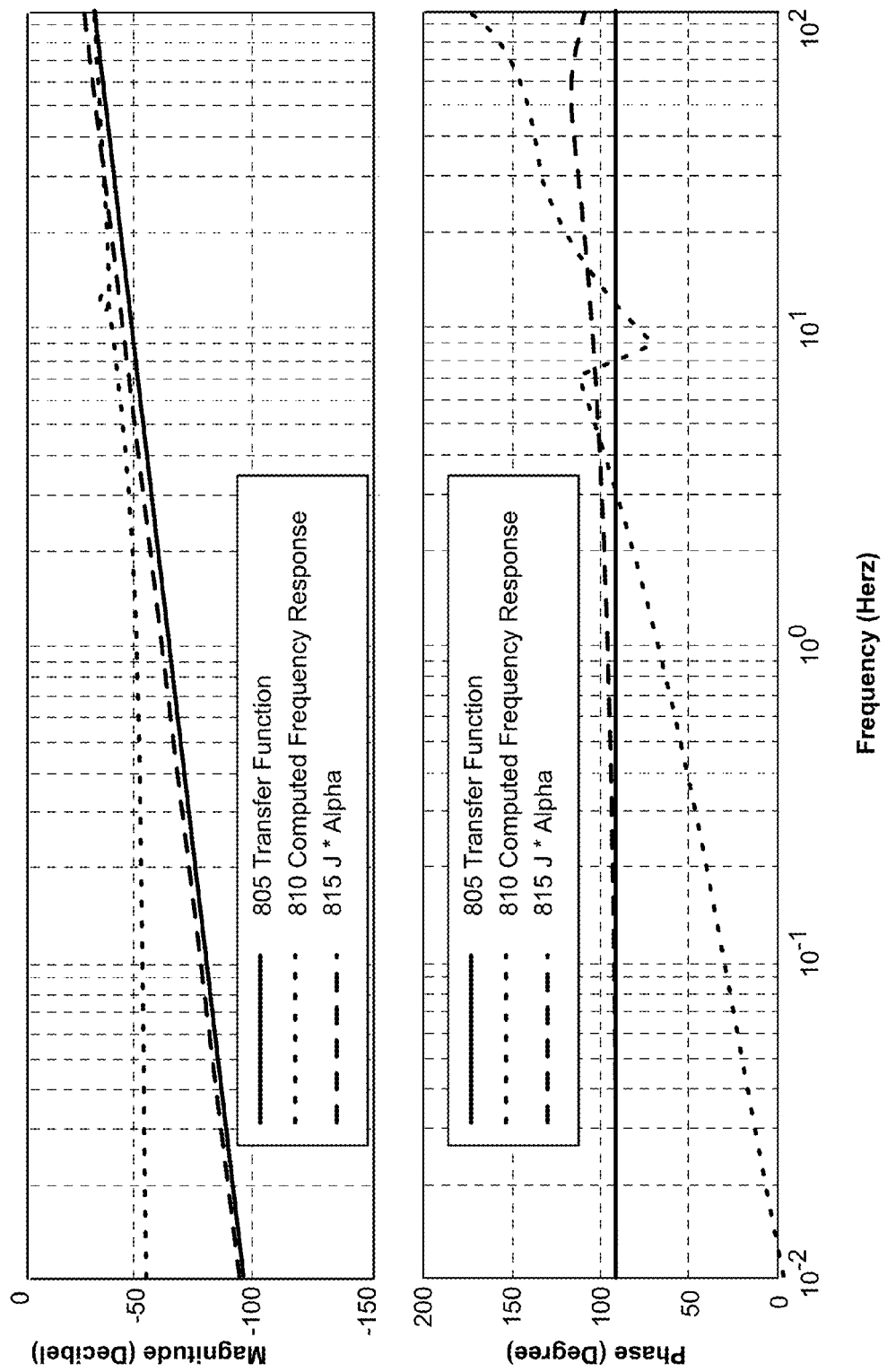
FIG. 8 illustrates bode plots that show comparison of designs in accordance to various embodiments of the invention.
Figure 9:
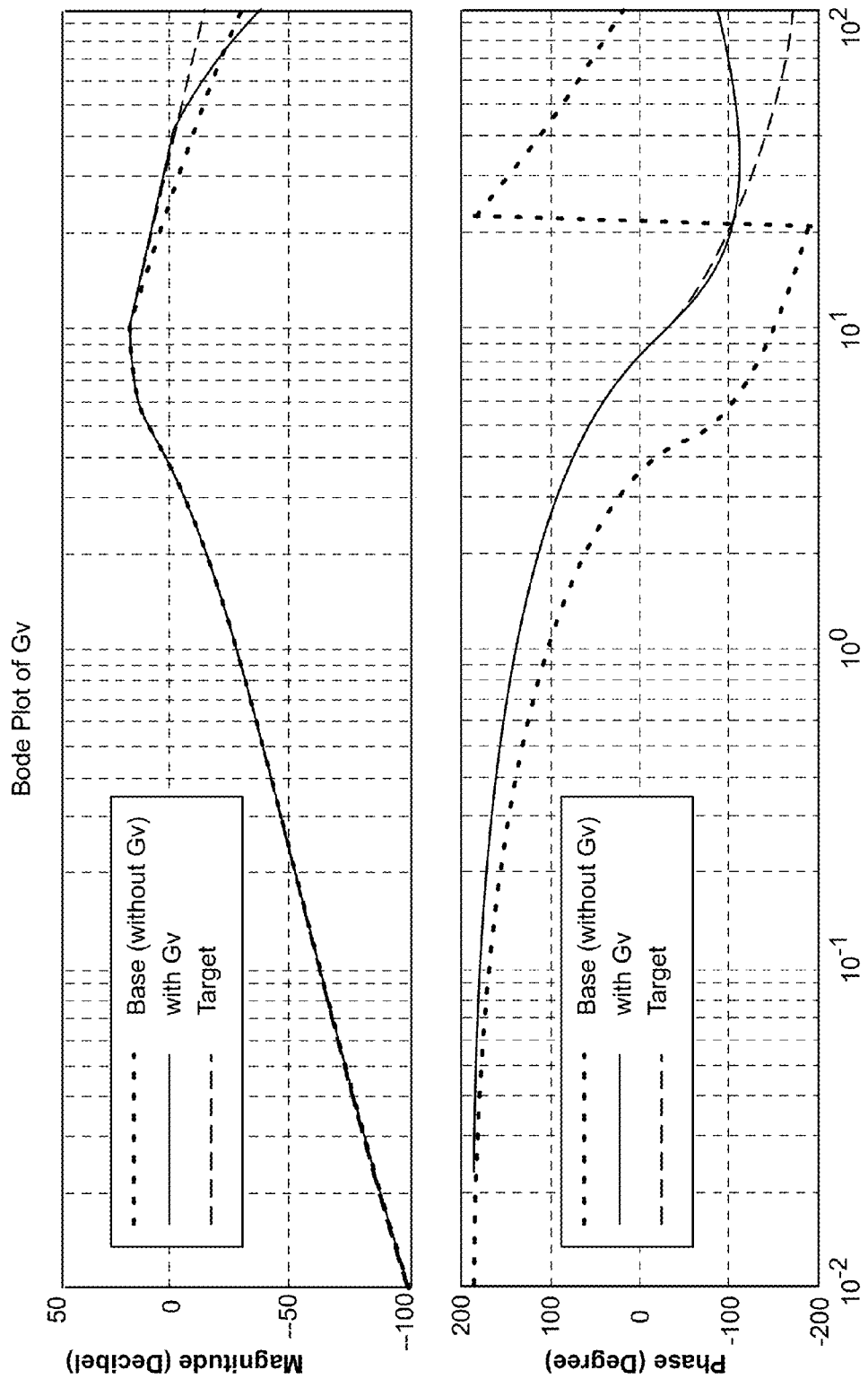
FIG. 9 illustrates bode plots that show comparison of designs in accordance to various embodiments of the invention.

In some embodiments, the s term in the equation (10) represents the differentiation, and the zero at 35 Hz starts giving a significant phase lead at 10 Hz. The two poles at 200 Hz are for implementation reasons and the two poles guard against noise. The bode plots illustrated in FIG. 8 shows how closely the above design (i.e., transfer function in the equation (10)) matches with the calculated version of Gv. Specifically, curves 805 in FIG. 8 represent the designed Gv and curves 810 represent the calculated version of Gv. The bode plot illustrated in FIG. 9 confirms that the designed Gv affects the open loop torque frequency response in a desired fashion. It shows that the new design provides an additional phase lead compared to the target. It should be noted that the target, although theoretically stable, would not create a robustly stable system. The additional phase lead in the designed system would create such stable system.

To realize the design for the physical configuration of the motor and the steering system, the transfer function of the equation (10) is normalized to form the following equation:

$$Gv = \frac{s(s + 35*2\pi)}{(s + 200*2\pi)^2} = \left(\frac{35}{200^2 2\pi}\right)\left(\frac{s(s + 35*2\pi)}{(s + 200*2\pi)^2}\right)\left(\frac{200^2 2\pi}{35}\right) \quad (11)$$

The first term of the right most side of the equation (11) is very close to the motor inertia $J_{mot}$ (e.g., within 3 dB) in the motor coordinate. Thus, Gv may now be referred to as inertia compensation (IC). The IC may be generalized as the equation (1):

$$IC = (J_{mot})(s)\left(\frac{(s + a*2\pi)}{(s + b*2\pi)^2}\right)\left(\frac{b^2 2\pi}{a}\right) \quad (1)$$

From the equation (1), it should be noted that the input (i.e., the motor velocity 218) and the output (i.e., IC, the inertia compensating torque command 220) are both in the motor coordinate. The s term (i.e., the second term in the right side of the equation) represents differentiation of the motor velocity (i.e., angular acceleration, α), and the parameters a and b provide dynamic effects when required. The right side of the equation (1) represents the IC transfer function. The first term of the transfer function is the motor inertia $J_{mot}$, and the rest of the terms of the IC transfer function represents the motor acceleration.

Having described the motor velocity based designs, the motor acceleration based designs will now be described. In the motor acceleration based designs, it is assumed that a sensor for measuring the rotational acceleration of the rotor is available (e.g., one of the sensors 31-33 of FIG. 1). The inertia compensation may be calculated the equation (2):

$$IC = (J_{mot})\left(\frac{(s + a*2\pi)}{(s + b*2\pi)^2}\right)\left(\frac{b^2 2\pi}{a}\right) \quad (2)$$

Figure 10:
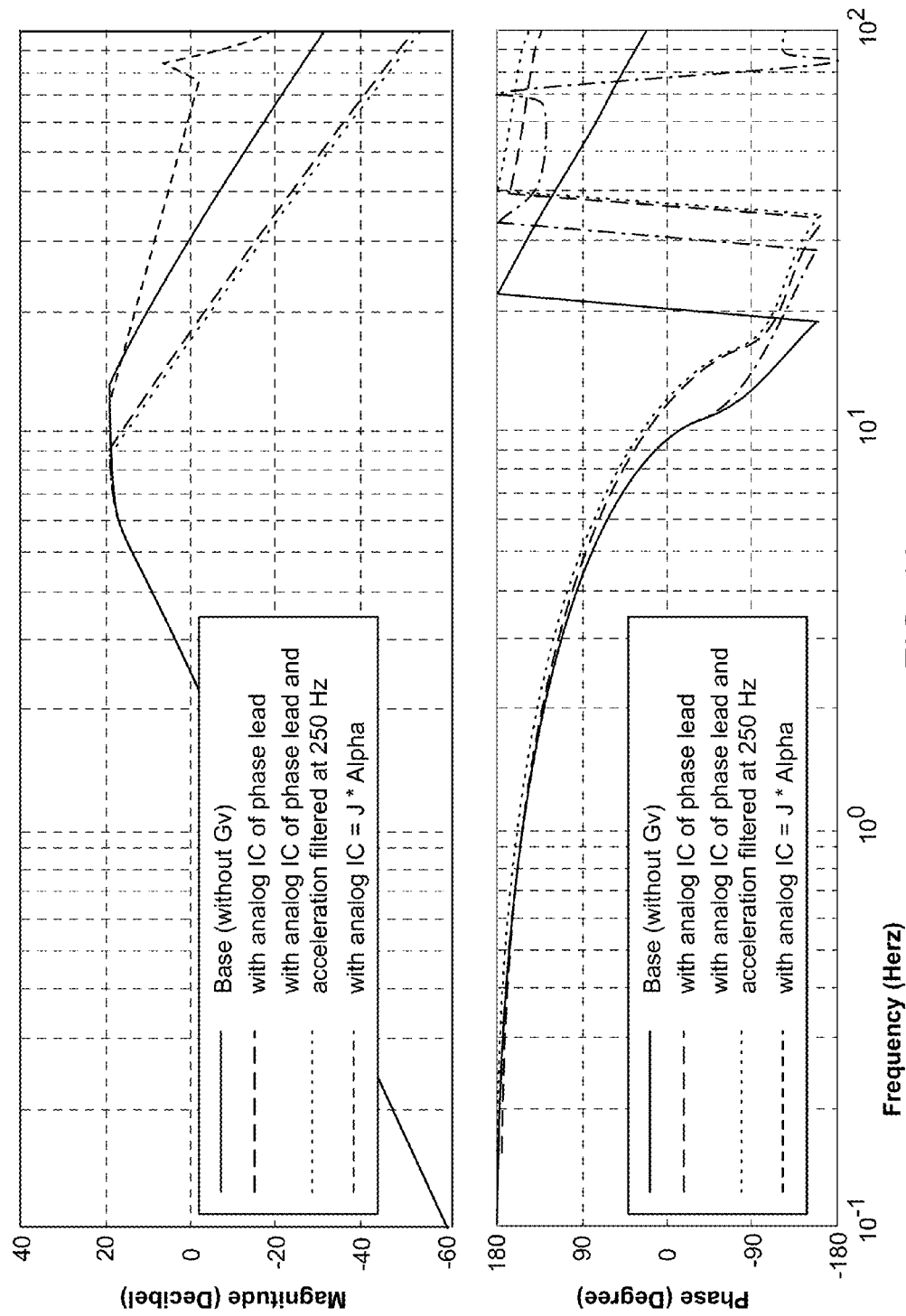
FIG. 10 illustrates bode plots that show a comparison of several alternative implementations of an equation in accordance to various embodiments of the invention.

In the equation (2), a derivative term (i.e., the s term in the equation (1)) is not necessary because the input to the algorithm is motor angular acceleration. The equation (2) may be implemented in various fashions. It should be noted that, regardless of how the equation (2) is implemented, the bandwidth of such measurement (as measured by 45° phase lag), including sampling effects, is required to be at least 250 Hz in some embodiments. FIG. 10 illustrates bode plots that show a comparison of several alternative implementations of the equation (2). These implementations meet the 250 Hz requirement as a minimum.

Figure 11:
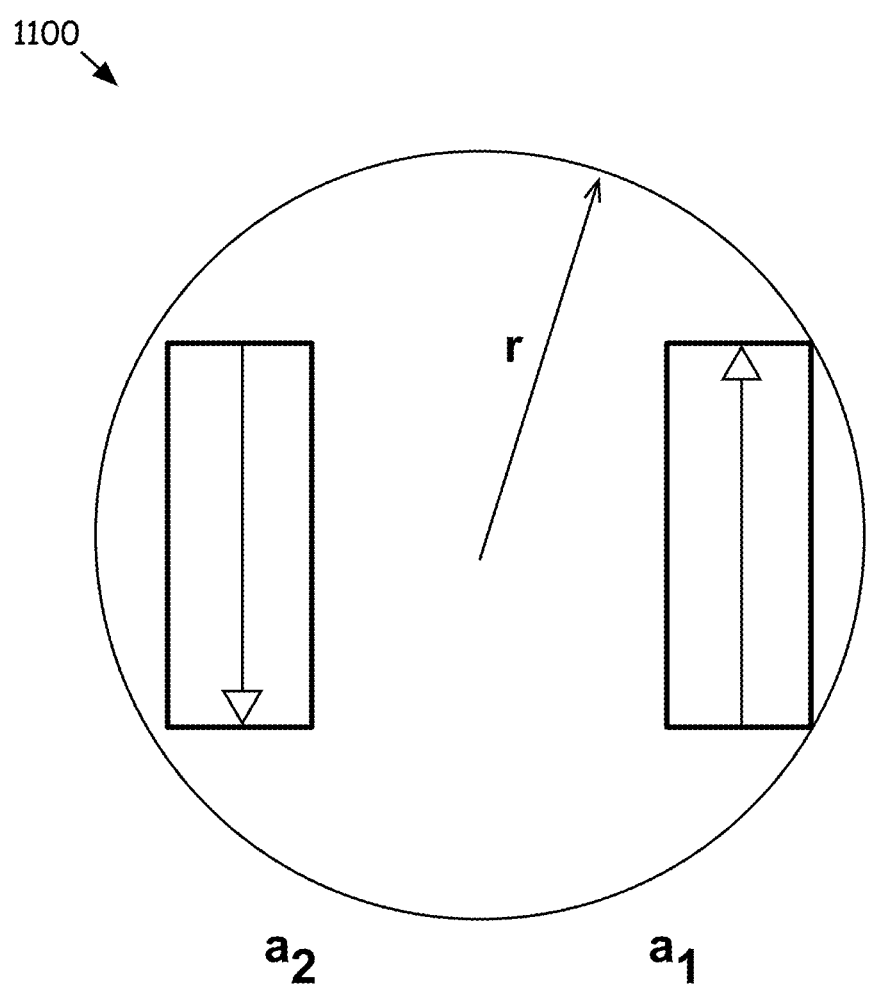
FIG. 11 illustrates a dual linear accelerometer sensing system in accordance with various embodiments of the invention.

In some embodiments, liner accelerometers are used to measure the motor acceleration. FIG. 11 illustrates a schematic diagram of a dual linear accelerometer sensing system 1100. It is to be noted that a vertical acceleration of the rotor shaft is cancelled by two sensors of this dual sensing system because one sensor registers a positive value and the other registers a negative value. The rotational acceleration is sensed based on the following equation:

$$\alpha = \frac{a_1 + a_2}{2r} \quad (12)$$

In some embodiments, the equation (12) implemented in a microprocessor (not shown).

In some embodiments, a magnetic pickup sensing system is used to measure the motor acceleration. In a magnetic pickup sensing system, signals are generated by the magnetic sensing element of the form: ω sin(θ) and ω cos(θ), where ω is motor velocity and θ is motor position. These signals are processed in hardware or a dedicated microprocessor to form the motor angular acceleration, α. The inertial torque signal J times α with some phase lead compensation, if required, would be added to the assist torque path in these embodiments.

Figure 12:
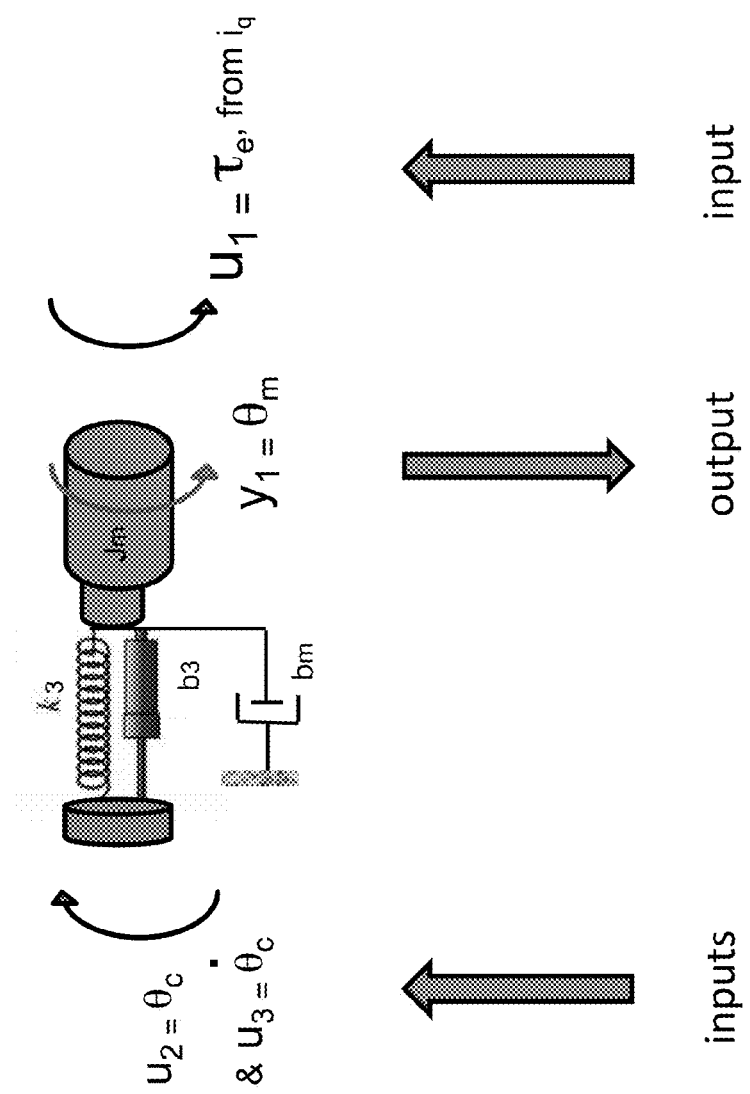
FIG. 12 illustrates an exemplary physical representation of an observer based model in accordance to various embodiments of the invention.

Having described the motor acceleration based designs, the observer based designs will now be described. In some embodiments, a linear sensor or observer is used to create the inertial torque, J times cc. To utilize this approach, a model that incorporates the observed (or estimated) quantity of the inertial torque is useful. FIG. 12 illustrates an exemplary physical representation of such model.

The boundaries of the model (i.e., inputs and outputs (I/Os)) are selected such that the model is not overly large, but at the same time, the I/Os are accessible. The inputs are the position at the bottom of the torsion bar, the rotational angle $\theta_c$ (and its derivative) as well as the electro-magnetic torque, $\tau_e$ (which is available via a measurement of motor current $i_q$). The output is motor position, $\theta_m$, which is also known from commutation needs. The dynamics of the model are represented by the following equations (13) and (14):

$$\begin{bmatrix} \dot{\theta}_m \\ \ddot{\theta}_m \end{bmatrix} = \begin{bmatrix} 0 & 1 \\ -\frac{k_3}{J_m} & -\frac{b_3 + b_m}{J_m} \end{bmatrix} * \begin{bmatrix} \theta_m \\ \dot{\theta}_m \end{bmatrix} + \begin{bmatrix} 0 & 0 & 0 \\ \frac{1}{J_m} & \frac{k_3}{J_m} & \frac{b_3}{J_m} \end{bmatrix} * \begin{bmatrix} \tau_e \\ \theta_c \\ \dot{\theta}_c \end{bmatrix} \quad (13)$$

$$\theta_m = [1 \ 0] * \begin{bmatrix} \theta_m \\ \dot{\theta}_m \end{bmatrix} + \begin{bmatrix} 0 & 0 & 0 \\ 0 & 0 & 0 \\ 0 & 0 & 0 \end{bmatrix} * \begin{bmatrix} \tau_e \\ \theta_c \\ \dot{\theta}_c \end{bmatrix} \quad (14)$$

where $b_3$, $k_3$, $b_m$, & $J_m$ are the motor axis damping, stiffness, motor to ground damping, and motor inertia, respectively. The vectors $$\begin{bmatrix} \theta_m \\ \dot{\theta}_m \end{bmatrix}, \begin{bmatrix} \tau_e \\ \theta_c \\ \dot{\theta}_c \end{bmatrix},$$

and $\theta_m$ are the state, input, and output vectors, respectively, and they are referred to as X, u, and Y, respectively, as in the following three equations (15), (16), and (17):

$$X = \begin{bmatrix} \theta_m \\ \dot{\theta}_m \end{bmatrix} \quad (15)$$

$$u = \begin{bmatrix} \tau_e \\ \theta_c \\ \dot{\theta}_c \end{bmatrix} \quad (16)$$

$$y = \theta_m \quad (17)$$

The state equations in an ABCD format are the following equations (18) and (19):

$$\dot{X} = A*X + B*u \quad (18)$$

$$Y = C*X + D*u \quad (19)$$

Figure 13:
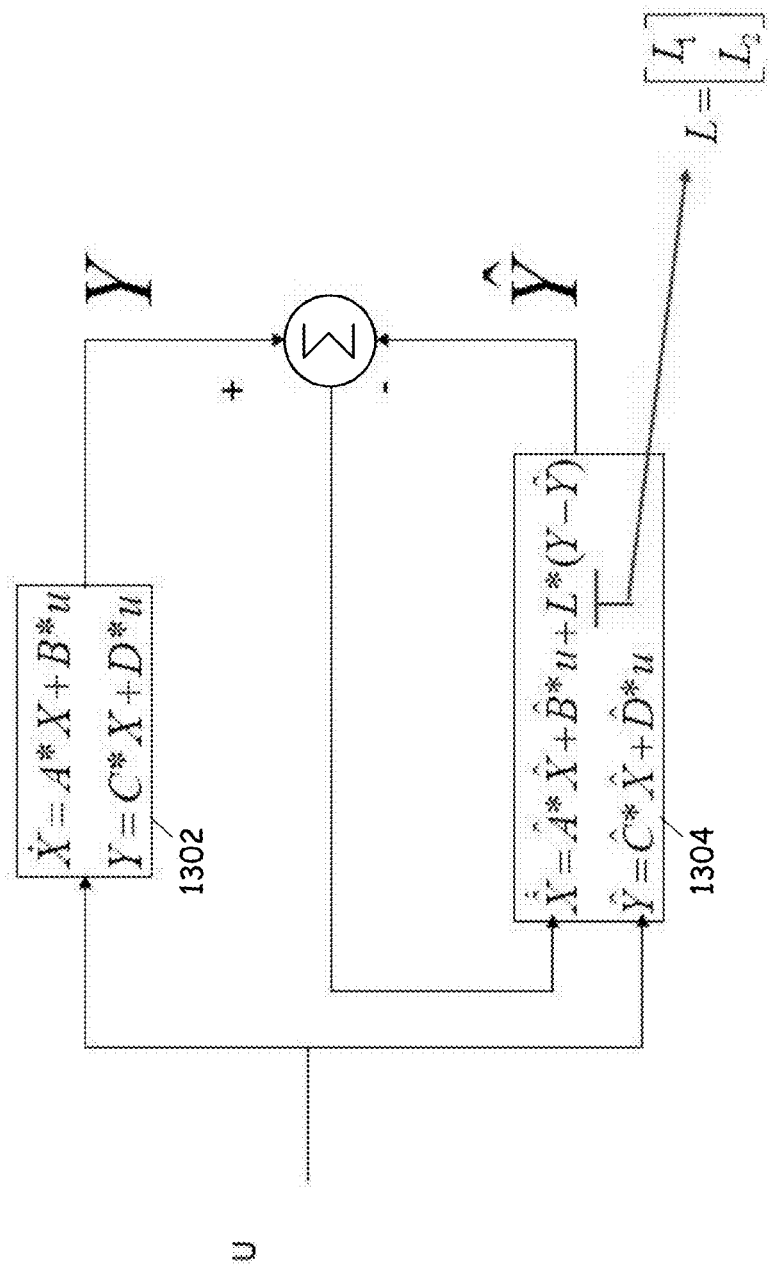
FIG. 13 illustrates an exemplary implementation of an observer based model in accordance to various embodiments of the invention.

FIG. 13 illustrates an exemplary implementation of an observer based model. As shown, both the motor mechanical system 1302 and the observer 1304 receive the same input vector, u. The ^ character denotes the observed or estimated version of a quantity of inertial torque. The discrepancy between the actual and observed output vectors are used as an additional input to the observer through the observer gain vector, L.

Figure 14:
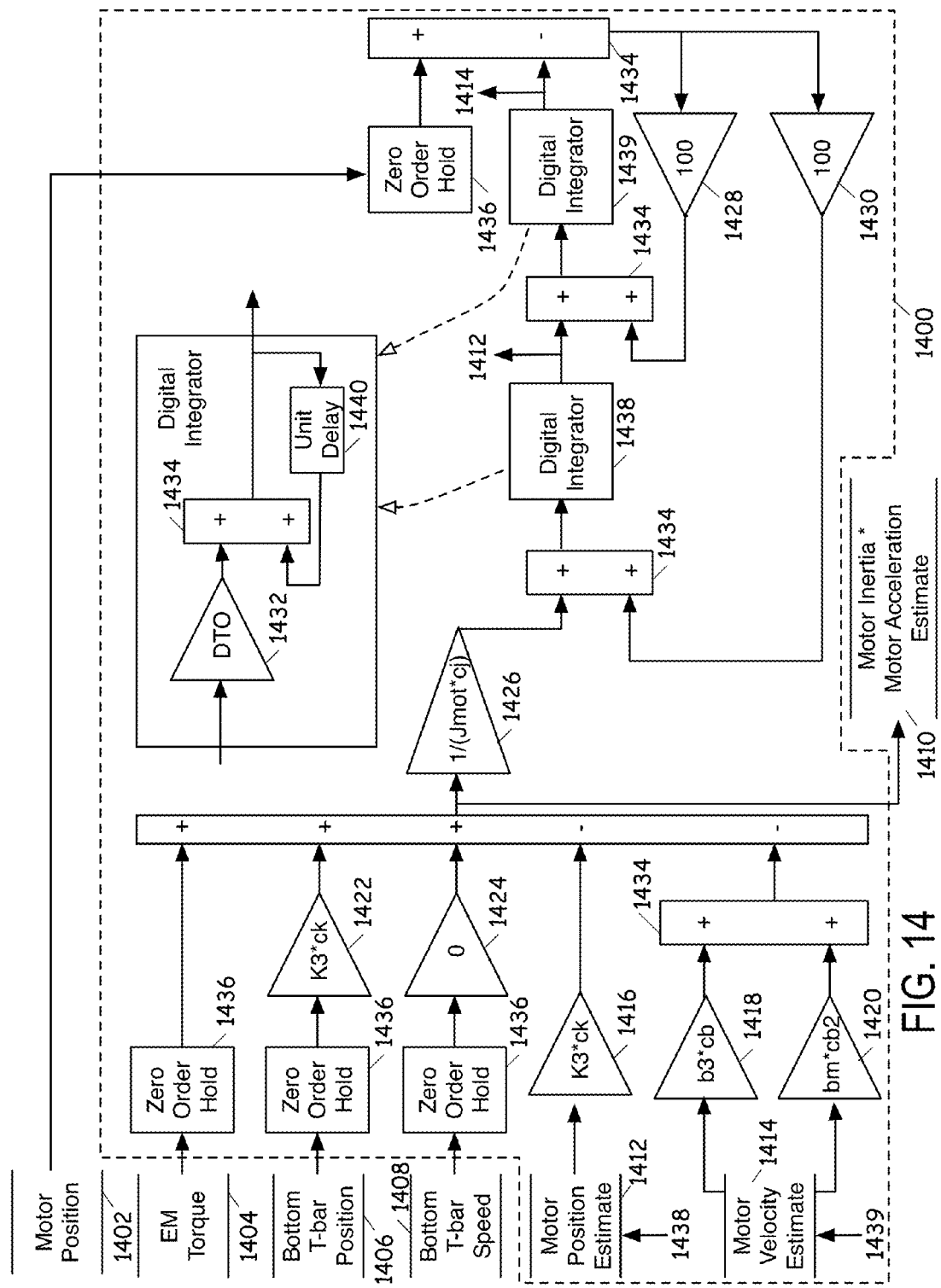
FIG. 14 is a block diagram illustrating an implementation of an observer in accordance to various embodiments of the invention.

FIG. 14 is a block diagram illustrating an exemplary digital implementation of the observer according to various embodiments of the invention. Specifically, FIG. 14 illustrates an observer 1400. In some embodiments, the observer 1400 includes gain units 1416-1432, summation units 1434, zero order hold units 1436 and digital integrators 1438 and 1439. Each digital integrator includes the gain unit 1432, a summation unit 1434, and a unit delay 1440.

The observer 1400 takes as inputs a motor position 1402, an electromagnetic torque 1404, a bottom of torsion bar position 1406 and a bottom of torsion bar speed 1408 and outputs a motor inertia times a motor acceleration estimate 1410. A motor position estimate 1412 and a motor velocity estimate 1414 are outputs of the digital integrators 1438 and 1439, respectively. In some embodiments, both gains 1428 and 1430 in the vector L is set as one hundred. Larger gains tend to reduce the discrepancies between the actual and observed quantities. It is to be noted that the bottom of torsion bar speed 1408 is nullified by zero gain 1424 as this input may not be directly available and thus is calculated. In order to use this digital implementation of the observer 1400, at least the approximate values of the motor subsystem parameters such as $b_3$, $k_3$, $b_m$, & $J_m$ should be known.

Figure 15:
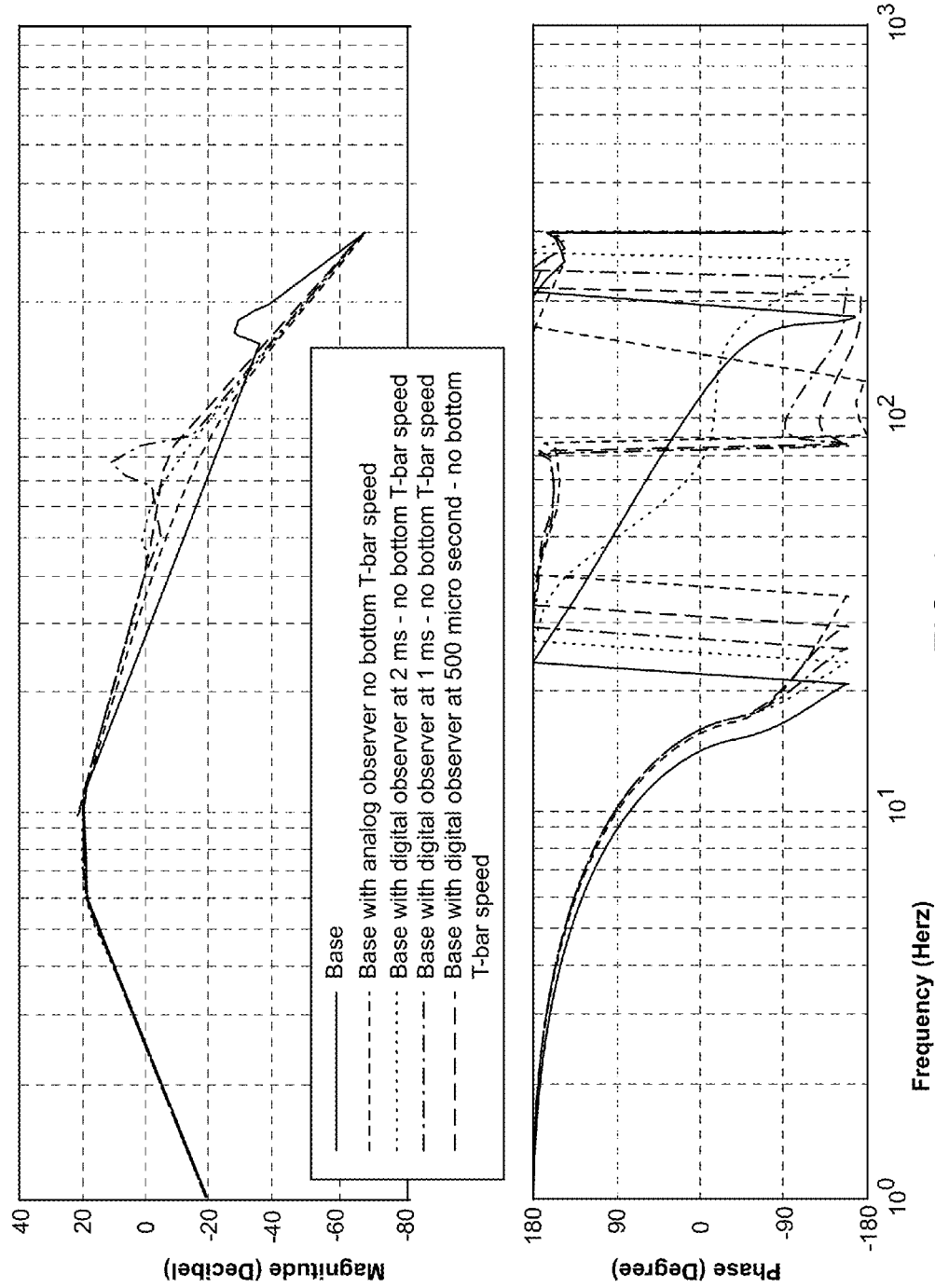
FIG. 15 illustrates bode plots that show a steering system model is capable of shifting the phase cross over frequency in accordance to various embodiments of the invention.

FIG. 15 illustrates bode plots that show the steering system model is capable of shifting the phase cross over frequency, when an observer is incorporated into the steering system model. The plots indicate that the bottom of the torsion bar speed may be avoided. However, in some embodiments, the digital observer must run at certain intervals (e.g., 500 microseconds) in order to have sufficient bandwidth and be effective.

Figure 16:
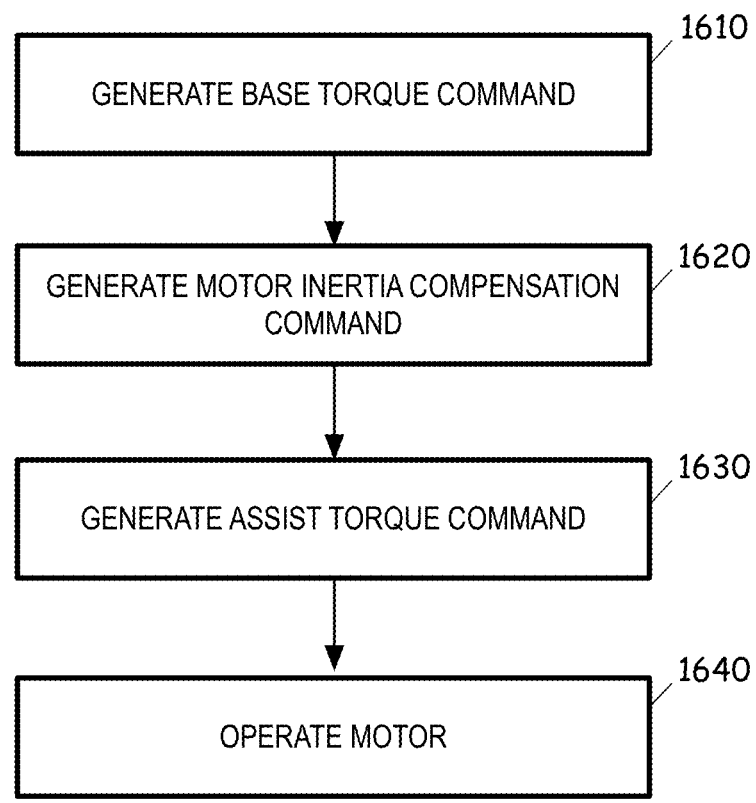
FIG. 16 illustrates a flow diagram illustrates a method for controlling a power steering system in accordance with various embodiments of the invention.

Referring now to FIG. 16, a flow diagram illustrates a method for controlling a power steering system, which the control module 40 may be configured to perform. As can be appreciated in light of the disclosure, the order of operation within the method is not limited to the sequential execution as illustrated in FIG. 16, but may be performed in one or more varying orders as applicable and in accordance with the present disclosure. In some embodiments, the method can be scheduled to run based on predetermined events, and/or run continually during operation of the vehicle 10.

At block 1610, the control module 40 generates a base torque command based on a hand wheel torque signal without altering the hand wheel torque signal at a range of relatively low frequencies. In some embodiments, the range of relatively low frequencies is below 70 Hz. That is, the control module 40 avoids filtering the hand wheel torque signal from the motor with a notch filter. In some embodiments, the control module generates the base torque command by filtering the hand wheel torque signal with a torque compensator for altering the hand wheel torque signal at a range of relatively high frequencies. In some embodiments, the range of relatively high frequencies is above 70 Hz.

At block 1620, the control module 40 generates a motor inertia compensation command based on a motor inertia of a motor of the power steering system. In some embodiments, the control module 40 generates the motor inertia compensation command by determining the motor inertia based on a motor velocity of the motor. In some embodiments, the control module 40 determines the motor inertia by differentiating the motor velocity of the motor to determine a motor acceleration of the motor. For instance, the control module 40 may utilize the equation (1) described above. In some embodiments, the control module 40 determines the motor inertia by receiving a motor acceleration of the motor from two linear accelerometer sensors (e.g., a dual linear accelerometer sensing system 1100) that measure the motor acceleration of the motor. With the received motor acceleration, the control module 40 may utilize the equation (2) described above. In some embodiments, the control module 40 generates a motor inertia compensation command by receiving a motor inertial torque from a linear observer that determines the motor inertial torque based on a bottom of torsion bar position.

At block 1630, the control module 40 generates an assist torque command based on the base torque command and the motor inertia compensation command. At block 1640, the control module 40 operates a motor of the power steering system to generate a torque based on the assist torque command.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while some embodiments of the invention have been described, it is to be understood that aspects of the invention may include only some of the described embodiments. Accordingly, the invention is not to be seen as limited by the foregoing description.

Having thus described the invention, it is claimed:

1. A method of controlling a power steering system, the method comprising:
    generating a base torque command based on a hand wheel torque signal without altering the hand wheel torque signal at a range of relatively low frequencies;
    generating a motor inertia compensation command based on a motor inertia of a motor of the power steering system;
    generating an assist torque command based on the base torque command and the motor inertia compensation command; and
    operating a motor of the power steering system to generate a torque based on the assist torque command.

2. The method of claim 1, wherein the generating the base torque command comprises avoiding filtering the hand wheel torque signal from the motor with a notch filter.

3. The method of claim 1, wherein the generating the base torque command comprises filtering the hand wheel torque signal with a torque compensator for altering the hand wheel torque signal at a range of relatively high frequencies.

4. The method of claim 3, wherein the range of relatively low frequencies is below 70 Hz and the range of relative high frequencies is above 70 Hz.

5. The method of claim 1, wherein the generating the motor inertia compensation command comprises determining the motor inertia based on a motor velocity of the motor.

6. The method of claim 5, wherein the determining the motor inertia comprises differentiating the motor velocity of the motor to determine a motor acceleration of the motor.

7. The method of claim 1, wherein the determining motor inertia comprises receiving a motor acceleration of the motor from two linear accelerometer sensors that measure the motor acceleration of the motor.

8. The method of claim 1, wherein the generating the motor inertia compensation command comprises receiving a motor inertial torque from a linear observer that determines the motor inertial torque based on a bottom of torsion bar position.

9. A control system for controlling a power steering system, the system comprising:
    a sensor for detecting observable conditions of a motor of the power steering system;
    a control module configured to:
    generate, with a hardware processor, a base torque command based on a hand wheel torque signal without altering the hand wheel torque signal at a range of relatively low frequencies;
    generate, with the hardware processor, a motor inertia compensation command based on a motor inertia of a motor of the power steering system;
    generate, with the hardware processor, an assist torque command based on the base torque command and the motor inertia compensation command; and
    operate, with the hardware processor, the motor to generate a torque based on the assist torque command.

10. The system of claim 9, wherein the control module is configured to generate, with the hardware processor, the base torque command by avoiding filtering the hand wheel torque signal from the motor with a notch filter.

11. The system of claim 9, wherein the control module is configured to generate, with the hardware processor, the base torque command by filtering the hand wheel torque signal with a torque compensator for altering the hand wheel torque signal at a range of relatively high frequencies, wherein the range of relatively low frequencies is below 70 Hz and the range of relative high frequencies is above 70 Hz.

12. The system of claim 9, wherein the control module is configured to generate, with the hardware processor, the motor inertia compensation command by determining the motor inertia based on a motor velocity of the motor received from the sensor.

13. The system of claim 12, wherein the control module is configured to determine the motor inertia by differentiating the motor velocity of the motor to determine a motor acceleration of the motor.

14. The system of claim 9, wherein the control module is configured to determine, with the hardware processor, the motor inertia by receiving a motor acceleration of the motor from the sensor, which comprise two linear accelerometer sensors that measure the motor acceleration of the motor.

15. The system of claim 9, wherein the control module is configured to generate, with the hardware processor, the motor inertia compensation command by receiving a motor inertial torque from the sensor, which comprises a linear observer that determines the motor inertial torque based on a bottom of torsion bar position.

16. A control system for controlling a power steering system, the system comprising:
    a first module configured to generate, with a hardware processor, a base torque command based on a hand wheel torque signal without altering the hand wheel torque signal at a range of relatively low frequencies;
    a second module configured to generate, with the hardware processor, a motor inertia compensation command based on a motor inertia of a motor of the power steering system;
    a third module configured to generate, with the hardware processor, an assist torque command based on the base torque command and the motor inertia compensation command; and
    a fourth module configured to operate, with the hardware processor, a motor of the power steering system to generate a torque based on the assist torque command.

17. The system of claim 16, wherein the generating the base torque command comprises avoiding filtering the hand wheel torque signal from the motor with a notch filter.

18. The system of claim 16, wherein the first module is configured to generate the base torque command by filtering the hand wheel torque signal with a torque compensator for altering the hand wheel torque signal at a range of relatively high frequencies, wherein the range of relatively low frequencies is below 70 Hz and the range of relative high frequencies is above 70 Hz.

19. The system of claim 16, wherein the second module is configured to generate the motor inertia compensation command by determining the motor inertia based on a motor velocity of the motor, wherein the determining the motor inertia comprises differentiating the motor velocity of the motor to determine a motor acceleration of the motor.

20. The system of claim 16, wherein the second module is configured to generate the motor inertia by receiving a motor acceleration of the motor from two linear accelerometer sensors that measure the motor acceleration of the motor.

* * * * *